(No Model.)  E. PATERSON.  2 Sheets—Sheet 1.

OYSTER DREDGE.

No. 279,792. Patented June 19, 1883.

WITNESSES:
Chas. Nida
C. Sedgwick

INVENTOR:
E. Paterson
BY Munn & Co.
ATTORNEYS.

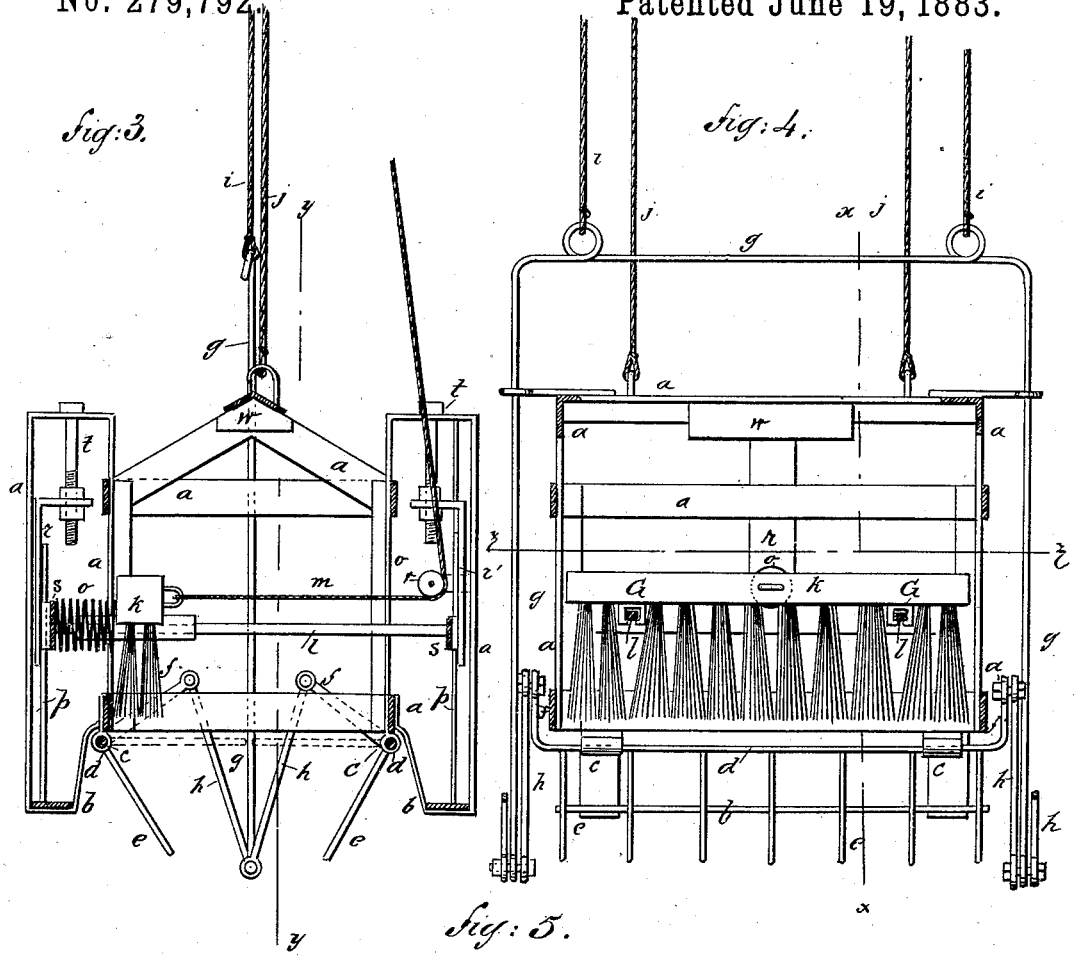

UNITED STATES PATENT OFFICE.

EDWIN PATERSON, OF PORT WASHINGTON, NEW YORK.

OYSTER-DREDGE.

SPECIFICATION forming part of Letters Patent No. 279,792, dated June 19, 1883.

Application filed March 29, 1883. (No model.)

*To all whom it may concern:*

Be it known that I, EDWIN PATERSON, of Port Washington, in the county of Queens and State of New York, have invented a new and Improved Oyster-Dredge, of which the following is a full, clear, and exact description.

Reference is to be had to the accompanying drawings, forming part of this specification, in which similar letters of reference indicate corresponding parts in all the figures.

Figure 1:
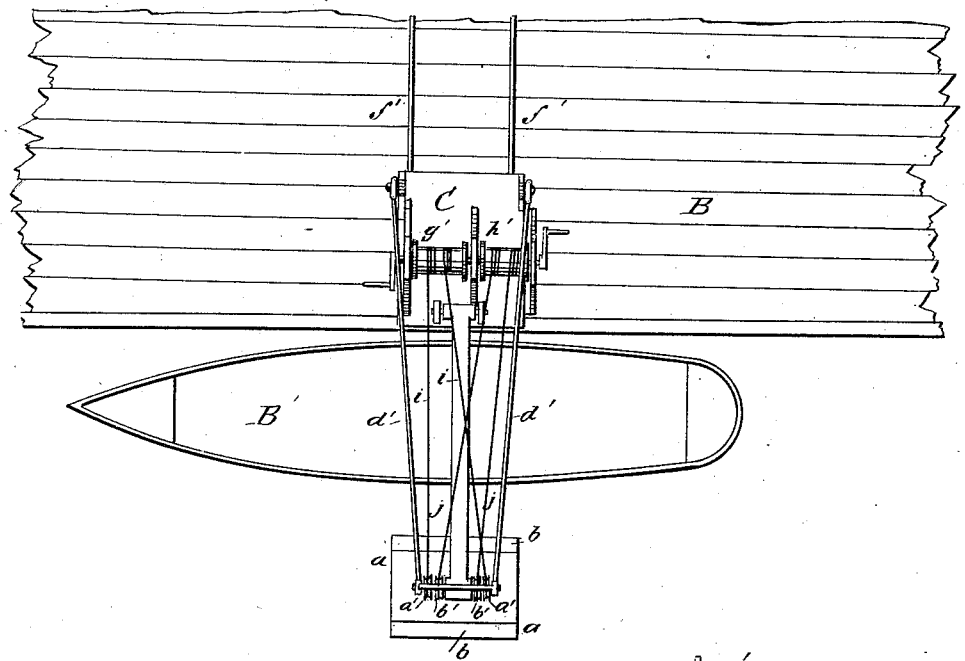
Figure 2:
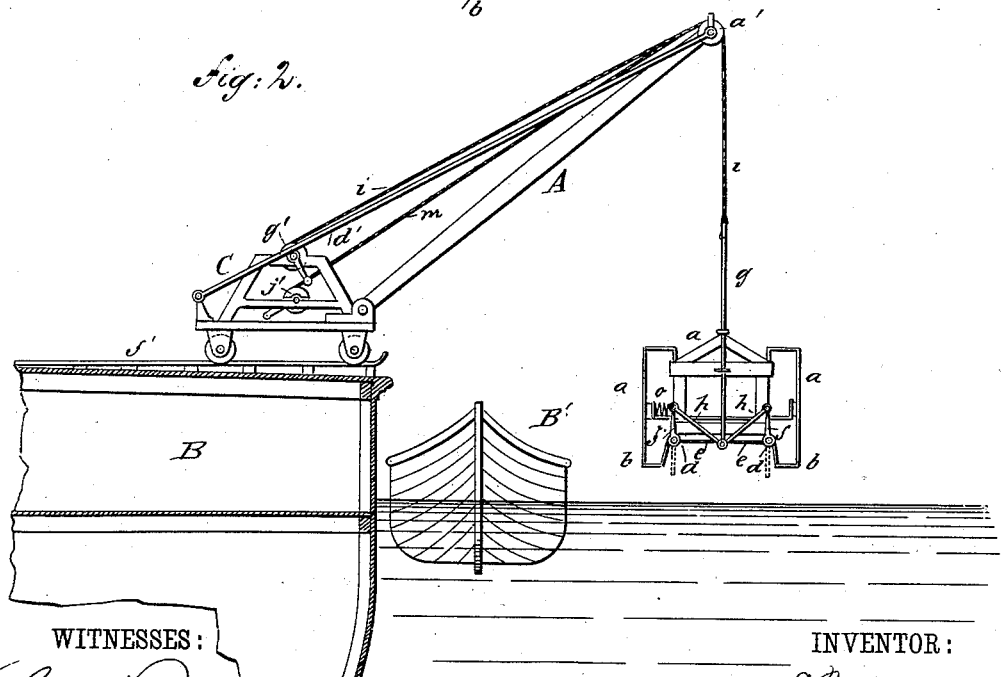

Figure 1 is a plan view, showing the preferred method of using my new and improved oyster-dredge. Fig. 2 is a sectional elevation of the same. Fig. 3 is a transverse sectional elevation of the dredge, taken on the line $x\ x$ of Fig. 4. Fig. 4 is a longitudinal sectional elevation taken on the line $y\ y$ of Fig. 3; and Fig. 5 is a sectional plan view of the dredge, taken on the line $z\ z$ of Fig. 4.

The object of this invention is to provide a practical machine for dredging oysters, clams, and other shell-fish; and the invention consists of the general construction, arrangement, and combination of the parts of the machine, all as hereinafter fully described and claimed.

Referring to the drawings, $a$ represents the iron frame of the dredge, which is formed with the two side foot-pieces, $b$.

Hinged in the loops $c$, that are attached to the frame above the foot-pieces $b$, are the two corresponding shafts, $d$, which have secured to them the grappling arms or teeth $e$, which are designed to be removable. The ends of the shafts $d$ are bent inward—that is, toward the center of the frame $a$—to form the cranks $f$, as shown clearly in Fig. 3, and the ends of these cranks are attached to the lower ends of the vertically-sliding bail $g$ by the connecting-rods $h$, which are hinged at their ends to the ends of the bail and the ends of the cranks, as shown clearly in Figs. 3, 4, and 5, so that upon the upward movement of the bail, which takes place when the dredge is lifted out of the water, the shafts $d$ will be turned upward, bringing the cranks $f$ to a vertical and the grappling-arms $e$ to a horizontal position, as shown clearly in Fig. 2; and upon the downward movement of the bail, which take place when the dredge is being lowered into the water, the shafts will be turned downward, bringing the cranks to a horizontal and the grappling-arms to a vertical position, as shown in dotted lines in Fig. 2, so that the points of the grappling-arms will properly penetrate the mud at the bottom. The dredge is raised out of the water by the ropes $i\ i$, attached to the bail $g$, and is lowered into the water by the ropes $j\ j$, attached to the frame $a$ of the dredge, as shown clearly in Fig. 4, and as will be hereinafter more fully described.

$k$ is a brush by which the mud may be washed off from the oyster-shells just before or just after they are lifted out of the water. The brush is adapted to slide upon the bars $l\ l$, held across the frame $a$ of the dredge by the cross-pieces $s\ s$, angle-plates $r\ r'$, and screws $t\ t$, and may be drawn forward over and in contact with the oysters on the grappling-arms $e$, against the tension of the spring $o$, by means of the rope $m$, the spring serving to draw the brush backward upon the cord $m$ being released.

The brush may be adjusted vertically, so that its bristles will come properly in contact with the oysters on the grappling-arms, by turning the screws $t\ t$, which will raise the angle-plates $r\ r'$, which are held in the vertical channel-bars, $p\ p$, for that purpose. These channel-bars also serve the purpose of keeping the brush from lateral or endwise movement.

The rope $m$ for operating brush $k$ is by preference passed over the pulley $v$, attached to the angle-plate $r'$, and from thence over the derrick-arm A back to the scow B; but the brush might be arranged upon the opposite side of the dredge, or the dredge turned around, in which case the rope $m$ might pass directly from the brush to the scow, in which case the pulley $v$ might be dispensed with.

$w$ is an air-chamber or float attached, in this instance, to the top of the frame $a$, and serves to prevent the dredge from sinking too rapidly when lowered.

The derrick-arm A is hinged to the carriage C, is provided at its outer end with the pulleys $a'\ a'$ and $b'\ b'$, over which the ropes $i\ i$ and $j\ j$ pass, and is held at the proper angle from the carriage B by the tie-rods $d'\ d'$, that reach from its outer end back to the carriage, as shown clearly in Figs. 1 and 2. The carriage C runs upon the rails $f'\ f'$, secured upon and forming a suitable track upon the deck of the scow B, and is provided with the winding-drums $g'\ h'$, over which the ropes $i\ i$ and $j\ j$, respectively, pass, and also with the drum $j'$, over which the brush-operating rope $m$ passes.

In operation, to lower the machine into the water, the drum $g'$ will be turned to give the ropes $i\ i$ perfect slack, which will throw the entire weight of the machine upon the ropes $j\ j$ and permit the grappling-arms $e\ e$ to drop to vertical position by the downward movement caused by the weight of the bail $g$, as above described. The machine will now be lowered to the bottom by letting back the drum $h'$. The machine having reached the bottom, its weight will cause the arms $e$ to penetrate the mud until the foot-pieces $b\ b$ rest upon the mud at the bottom. The drum $g'$ will now be turned to wind up the ropes $i\ i$, which will bring the grappling-arms $e\ e$ to a horizontal position, gathering upon them all of the oysters in their reach; and the turning of this drum $g'$ will continue until the machine reaches the surface of the water, at which point the turning will cease, and the brush $k$ will be operated for cleaning the oysters by turning backward and forward the drum $j'$. This having been done, the machine will be still further elevated by turning the drum $g'$ until the machine reaches a sufficient height to clear the side of the small boat B'. The carriage C will then be run back upon its track to bring the machine over the said boat B'. The drum $h'$ will now be turned to throw the weight of the machine upon the ropes $j\ j$, whereupon the drum $g'$ will be set free for dumping the oysters into the small boat. The carriage will now be moved forward to the edge of the boat B, and the boat B moved forward or backward the length of the dredging-machine, and then the operation will be repeated. In this manner it will be seen that the oysters may be gathered clean from the bed, and that the work may be done easily and rapidly.

Instead of using the drum $h'$, a cleat may be attached to the carriage C, over which the ropes $j\ j$ may be passed by hand and the rope let gradually off from the cleat for lowering the machine; and instead of placing the carriage C upon a track crosswise of the boat B it might be placed on a track running lengthwise of the boat, so that the carriage, instead of the boat, may be moved the length of the dredge at each grappling, in which case movable blocks would be used at the outer end of the derrick-arm for bringing the dredge over the boat B' for dumping.

Having thus described my invention, what I claim as new, and desire to secure by Letters Patent, is—

1. In an oyster-dredge, the frame $a$, having the foot-pieces $b$, and the grappling-shafts $d$, having the arms or teeth $e$, and operating mechanism for the said shafts, substantially as and for the purposes set forth.

2. The combination, with the grappling-shafts $d$ and teeth $e$, of the brush $k$, arranged above the teeth, substantially as and for the purposes described.

3. In an oyster-dredge, the combination of the cleaning-brush $k$, guides $p\ p$, the brush-supporting bars $l\ l$, cross-pieces $s\ s$, angle-arms $r\ r'$, and screws $t$, substantially as and for the purpose set forth.

4. In an oyster-dredge, the combination, with the grappling-arms and their operating mechanism, of the cleaning-brush adapted to be moved over the contents of the said arms or teeth and to be automatically returned, substantially as and for the purpose set forth.

5. In an oyster-dredge, the combination, with the bars $l\ l$, of the brush $k$ placed thereon, rope or chain $m$, and the spring $o$ for returning the brush, substantially as and for the purposes set forth.

6. In an oyster-dredge, the combination, with the cleaning-brush, rendered vertically adjustable by means of the screws $t$, and angle-arms $r\ r'$, connected to the brush-supporting bars, of the operating rope or chain $m$ and the spring $o$, substantially as and for the purpose set forth.

EDWIN PATERSON.

Witnesses:
H. A. WEST,
C. SEDGWICK.